United States Patent [19]

Yoshio

[11] 4,007,606

[45] Feb. 15, 1977

[54] HYDROGEN GAS EXTRACTOR

[75] Inventor: Fujita Yoshio, Mihara, Japan

[73] Assignee: Mitsubishi Jukogyo Kabushiki Kaisha, Tokyo, Japan

[22] Filed: Nov. 17, 1975

[21] Appl. No.: 632,630

[30] Foreign Application Priority Data

Dec. 2, 1974  Japan .............................. 49-136984

[52] U.S. Cl. .............................................. 62/475
[51] Int. Cl.² ......................................... F25B 43/04
[58] Field of Search ................................ 62/85, 475

[56] References Cited

UNITED STATES PATENTS

| 2,384,861 | 9/1945 | Roswell | 62/475 |
| 2,432,978 | 12/1947 | Anderson, Jr. | 62/475 |
| 2,691,280 | 10/1954 | Albert | 62/475 |
| 3,358,465 | 12/1967 | Russell | 62/475 |
| 3,360,950 | 1/1968 | Osborne | 62/475 |

Primary Examiner—Lloyd L. King

[57] ABSTRACT

A hydrogen gas extractor adapted for use with a refrigerating machine in which a high vacuum is maintained and hydrogen gas is evolved largely by corrosive reactions of a solution, comprising a case, hydrogen gas exhaust means fabricated of palladium or its alloy and gas tightly secured through the walls of said case, a connecting pipe communicated at one end with said machine and open at the other end in said case, a mass of metal contained in said case, said metal being capable of occluding hydrogen gas at ordinary temperature and releasing the same at elevated temperature, and heater means for heating both said hydrogen gas exhaust means and said metal.

8 Claims, 7 Drawing Figures

HYDROGEN GAS EXTRACTOR

This invention relates to a hydrogen gas extractor adapted for use with apparatus, such as absorption refrigerators, in which a high vacuum is maintained and hydrogen gas is produced largely by corrosive reactions of the solution inside.

An example of the absorption refrigeration system machines (of the type using no single-utility solution-, refrigerant-, or air-pump) commonly in use will first be described in conjunction with FIG. 1 of the accompanying drawings. The system essentially comprises a generator 1, a vapor-liquid separator 2, a condenser 3, an evaporator 4, an absorber 5, and a heat exchanger 6, all interconnected by pipes and ducts and filled with a necessary amount of solution. Cooling pipes 7, 8 in the absorber 5 and the condenser 3, respectively, are connected to a common cooler 9 via a cooling water circulating pump 10. Similarly, a cold-hot water pipe 11 in the evaporator 4 is connected to a fan-coil or other air conditioning unit 12 through a cold-hot water circulating pump 13. The generator 1 is equipped with a heater 14, which may be of external heating type (e.g., a gas- or oil-burner) or of internal heating type (e.g., a steam- or hot water-piping), although a burner is shown in the general arrangement. Reference numeral 15 designates a palladium cell. The solution to be employed may be, for practical purposes, ammonia water (ammonia as the refrigerant and water as the absorbent), aqueous solution of lithium bromide (water as the refrigerant and lithium bromide as the absorbent) or the like. Where a high vacuum is to be maintained within the system, the use of an aqueous solution of lithium bromide is preferred.

For cooling, the absorption refrigerator of the construction just described operates in the following manner. As the heater 14 boils the solution in the generator 1, the solution rises together with bubbles of water vapor into the separator 2, where it is separated into water vapor and a concentrated solution or strong liquor. The water vapor is then condensed to water in the condenser 3 and vaporized in the evaporator 4, carrying off heat from the cold-hot water pipe 11 (thus producing cold water in the pipe). On the other hand, the strong liquor from the separator flows downward through the heat exchange 6 into the absorber 5, where it absorbs the water vapor from the evaporator 4, thereby promoting the function of the evaporator 4. The resultant thin solution or weak liquor returns through the heat exchanger 6 to the generator 1 so as to repeat the above-described cycle.

Heating operation of the system is performed as follows. While the cooling pipes 7, 8 are kept free of cooling water, the water vapor from the separator 2 is conducted to the evaporator 4 without being condensed in advance by the condenser 3. In the evaporator the water vapor condenses while releasing the heat of condensation through the cold-hot water pipe 11 (thus producing hot water in the pipe). Except for the foregoing, the same procedure as in cooling is followed.

The refrigerating machines of the character described contain high vacuums in order to evaporate (or boil) the refrigerant at low temperatures. During cooling operation, for example, the pressure between the generator 1 and the condenser 3 is kept within the range from 60 to 70 mm Hg, and the pressure between the evaporator 4 and the absorber 5 within the range from 6 to 7 mm Hg. Thus, the evaporating and absorbing functions of the machines will be seriously affected should any noncondensible gas gain its entrance into the system. Also, the presence of air is objectionable because it can pose a problem of corrosion by the solution.

Noncondensible gases the system may encounter include:
 a. Gases (mainly air) left in the system after the fabrication or assembling of the machine.
 b. Air intruding into the system through joints.
 c. Hydrogen gas evolved by corrosive reactions of the solution inside the system.

In many cases, large-capacity refrigerating machines are provided with pumps for supplying, circulating, or spraying the solution through the generator 1, evaporator 4, absorber 5, and other components. Accordingly, there are possibilities of air intrusion into the system through the flanges, seals around shafts, etc. of the pumps. An air pump to drive off the air is, therefore, an essential adjunct to such machines. On the other hand, smaller machines often dispense with solution pumps and are of welded construction which omits air pump and simplifies the operation. The following discussion will be directed mainly to the machines of the type not equipped with such air pump. Of the noncondensible gases listed above, those in (a) are related to the performance of the vacuum pump employed and the air leak in (b) is concerned with the welding and leak detection techniques. Today, both are no longer problems of practical importance. As for (c), by contrast, constant evolvement of hydrogen gas due to corrosive reactions of the solution with the component materials of the refrigerators remains inevitable despite the efforts of the manufacturers to combat the corrosion problem through the addition of their specially prepared inhibitors.

As one of such attempts, a film of palladium or its alloy heated to about 300° to 500° C is frequently utilized in the mechanisms of absorption refrigerators for automatically driving off internally produced hydrogen gas from the system while avoiding the ingress of air from the outside. As is well known, such films are permeable only for hydrogen gas and are therefore in use for the refinement and separation of hydrogen gas in the process of commercial production. The palladium cell 15 in FIG. 1, which represents such a mechanism as mounted on the evaporator 4, is shown in more detail in FIGS. 2 and 3. Throughout these figures, 16 is a duct extended from the evaporator 4, 17 is a case holding a pipe 18 of palladium or its alloy extended therethrough and gastightly secured to the case wall by brazing or other suitable means, 19 is a heater (which may be installed inside of the case although shown outside), and 20 is lagging. Since the hydrogen concentration in the atmosphere is nearly zero, hydrogen gas produced within the refrigerator would be caused to permeate through the pipe 18 by the difference in hydrogen concentration (or in pressure) and released to the atmosphere automatically in the direction indicated by an arrow.

However, such an arrangement for removing hydrogen gas has the following disadvantages:
 a. Even in spring and autumn when neither cooling nor heating is necessary, that is, when the refrigerating machine is out of operation, the heater 19 must remain in the ON position; otherwise, hydrogen gas will gradually gather up to such an extent that, when the machine is started, especially for cooling, it can cause deterioration of the performance, a source of complaint from the user. Originally such machines are designed to keep the heater 19 on after the stoppage of the machine proper, but it frequently occurs that the user inadvertently turns off the main switch.

b. The same problem can also arise when the interval between the shipment of machine and the initiation of operation on site is prolonged.

c. Although the heater 19 is of a rating of only about 30 W for the machine capacity of 5 to 10 tons of refrigeration, it is wasteful and against the national tendency toward energy saving to keep the heater on while the machine is not running for cooling or heating. In addition, it imposes an extra burden of electricity cost on the user.

The present invention has been perfected with the view to eliminating the disadvantages of the prior art absorption refrigerators, and accordingly it is an object of the invention to improve the hydrogen gas extractor for such refrigerators and the like.

The object of the invention is realized by a hydrogen gas extractor adapted for use with machines in which a high vacuum is maintained and hydrogen gas is evolved largely by corrosive reactions of a solution, comprising a case, hydrogen gas exhaust means fabricated of palladium or its alloy and gastightly secured through the walls of the case, a connecting pipe communicated at one end with the machine and open at the other end in the case, a mass of metal contained in the case, said metal being capable of occluding hydrogen gas at ordinary temperature and releasing the same at elevated temperature, and a heater for heating both the hydrogen gas exhaust means and the metal.

For the purpose of the invention, the metal for occluding hydrogen gas usually may be a precious metal or its alloy. Packing the extractor with a sufficient amount of the metal for occluding the total volume of hydrogen gas that will be produced during the entire life of the refrigerator (about 15 years) is infeasible for cost reason. Also, using the metal in the form of interchangeable capsuled pieces that may be replaced or regenerated with heat at intervals of some years is undesirable because of the high vacuum used in the system. According to the present invention, the amount of the occlusive metal has to be only enough for incorporating the hydrogen gas production in either spring or autumn or the continuous period of mild climate (each lasting about three months) when the machine lies idle.

With the construction in accordance with the invention, the present refrigerating machine can allow the metal to occlude the hydrogen gas produced and thereby limit the hydrogen pressure within the permissible range during the inoperative period so as to be ready for the resumption of operation. During the operative period, the hydrogen gas being produced is discharged, together with that which was occluded during the inoperative period, through the permeable film of palladium or its alloy. This assures a smooth, uninterrupted recycling operation of the machine.

Next, the equilibrium relationship between the hydrogen pressure and the amount of occlusion will be considered below with respect to the metal that occludes hydrogen gas to form a hydride. As indicated in FIG. 4, increasing the pressure of hydrogen around the occlusive metal while maintaining the temperature at $T_1$ will form a solid solution of the hydrogen up to the composition A. From then on, the formation of a hydride will begin and, throughout the period of hydride formation, the hydrogen pressure will remain constant at the level $P_1$. From the point of the composition B where the formation of the hydride is concluded, the hydrogen pressure will rise again. This means that a large amount of hydrogen is occluded in the region between A and B. If the temperature is $T_2$ ($T_2 > T_1$), the dissociation pressure of hydrogen $P_2$ ($> P_1$) will increase, causing the dissociation of hydrogen gas provided the pressure of hydrogen around the metal is low.

Thus, important considerations governing the choice of occlusive metal are that a. the metal provides an equilibrium pressure $P_1$ below the pressure of hydrogen allowed to be present at the temperature $T_1$ during the inoperative period and has a large occlusion capacity (B);

b. undergoes no change in properties despite repeated cycles of hydrogen absorption and dissociation;

c. is practically inert to noncondensible gases other than hydrogen gas, in particular to water vapor; and d. available at low cost.

The amount of occlusive metal to be required is such that, when it has occluded the total volume of hydrogen gas produced during the inoperative period, its equilibrium pressure is not higher than the point B in FIG. 4. It is to be noted, in this connection, that the hydrogen gas production depends also on the materials of liquid-contacting surfaces, concentration of the solution, effect of the corrosion inhibitor used, and the volume of residual air in the system. An example of useful occlusive metals is a palladium alloy containing from 20 to 25% of silver.

The above and other objects and advantages of the present invention will become more apparent from the following description taken in conjunction with the accompanying drawings showing preferred embodiments thereof. In the drawings.

Figure 2:
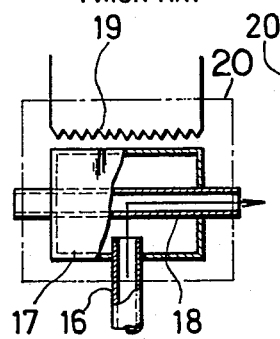
FIG. 2 is a sectional side view of a prior art hydrogen gas extractor.
Figure 3:
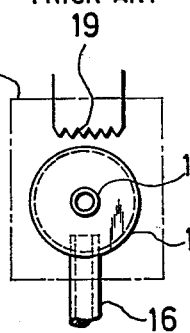
FIG. 3 is a front elevational view of the extractor shown in FIG. 2.
Figure 4:
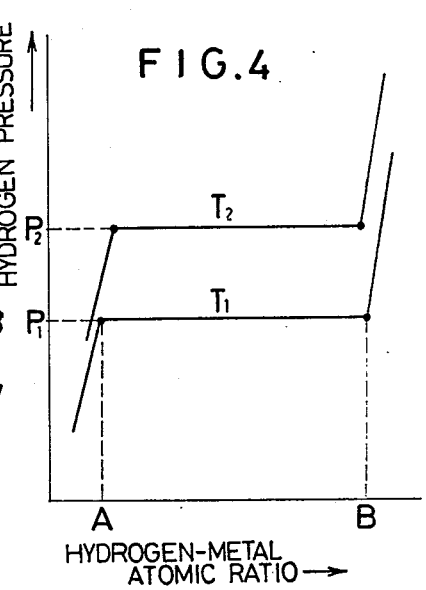
FIG. 4 is a graph showing the relationship between the hydrogen pressure and the amount of occlusion by a metal that occludes hydrogen gas and forms a hydride.
Figure 5:
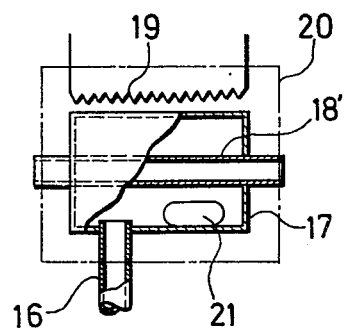
FIGS. 5, 6 and 7 are sectional side views of three different embodiments of the hydrogen gas extractor of the invention.

1. In the case where the rates of hydrogen gas production during the operative and inoperative periods of the machine are substantially the same, the velocity of dissociation of hydrogen from the occluding metal is slow even at $T_2 = 300° - 500°$ C in FIG. 4, and an amount of the occlusive metal enough for dissociating hydrogen within the permissible range of hydrogen pressure is used during the operative period:

In this case the embodiment illustrated in FIG. 5 (where like parts have been given like numbers and similar parts like numbers primed with respect to FIGS. 2 and 3) uses a film 18' of palladium or its alloy with a permeability more than twice that of the film 18, and contains a mass of occlusive metal 21 in the case 17. During the period in which the machine is out of operation, the temperature in the hydrogen gas extractor embodying the invention is ordinary ($T_1$) but the metal 21 occludes hydrogen gas and maintains the hydrogen pressure $P_1$ adequately lower than the maximum value of the permissible range.

After the machine has started running, the heater 19 is switched on. Upon arrival of the temperature at $T_2 = 300° - 500°$ C, hydrogen gas is gradually dissociated from the occlusive metal 21 and it is discharged, together with the hydrogen gas being produced by the running machine, out of the system via the permeable film 18' of palladium or its alloy.

Figure 1:
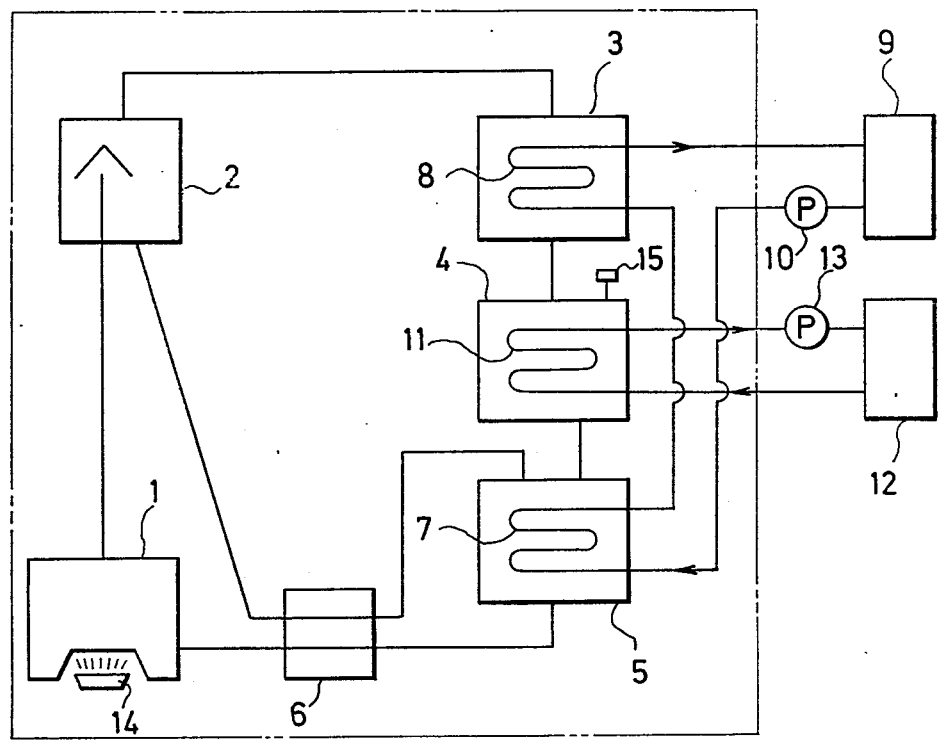
FIG. 1 is a flow diagram of the refrigeration system of a conventional absorption refrigerator.
Figure 6:
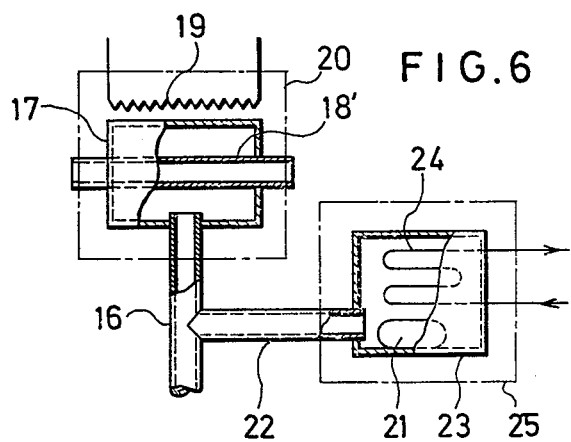

2. Where the dissociation velocity is appropriate at $T_2 = 40 - 60°$ C under the same conditions as above:

Here, as shown in FIG. 6, the duct 16 is branched midway and the branch duct 22 thus provided is connected to another case 23 in which the occlusive metal 21 is placed. The additional case is equipped with a heater 24 and enclosed in lagging 25. The heater 24 may be connected to either combination of the cooling pipe 8 and the cooler 9 or the cold-hot water pipe 11 and the air conditioning unit 12 so that, by the changeover of a valve not shown, the cold water produced by the former is utilized when cooling is necessary or the hot water by the latter when heating is required. Where the dissociation temperature must be $T_2 = 100° - 200°$ C, it is possible to make use of the exhaust from the burner 14 in FIG. 1 in lieu of the heater 24. As a further modification, when any other specific temperature must be used, an additional heater (other than those shown in FIGS. 2 and 3) may be installed in the additional case 23.

Figure 7:
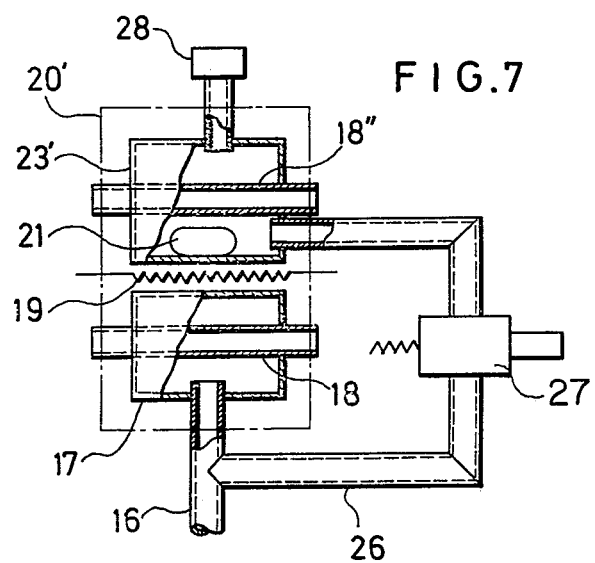

3. Where the inoperative period of the machine is prolonged or the hydrogen gas production during the ordinary inoperative period is so large that adequate dissociation within the permissible hydrogen pressure range is not accomplished during the operative period and hence it is feared that difficulty will be involved in the occlusion during the next inoperative period:

As shown in FIG. 7, an additional duct 26 is branched from the duct 16 and is connected to an additional case 23' via a solenoid valve 27 which is electrically closed while the machine is in operation and is opened by spring force when the machine lies idle. The additional case 23' contains a mass of occlusive metal 21, holds a pipe 18" of palladium or its alloy extended therethrough, and is equipped with a safety valve 28 designed for a blow-off pressure of about 1.1 kg/cm² abs. The case 17 and the additional case 23' are wrapped together by lagging 20' with the heater 19 installed inside. While the machine is out of operation, the solenoid valve 27 is held open by spring force and hydrogen gas evolved in the system is occluded by the metal 21. Simultaneously with the resumption of operation, the solenoid valve 27 closes and the heater 19 increases the temperature inside the extractor to $300° - 500°$ C. Even when the occlusive metal 21 rapidly dissociates hydrogen gas, the resulting gas will be blown out of the safety valve 28 until the blow-off pressure of about 1.1 kg/cm² abs. is reached, thus avoiding intrusion of external air. The rest of hydrogen gas is exhausted out of the machine through the pipe 18" of palladium or its alloy. As with the conventional arrangement, the ordinary pipe 18 of palladium or its alloy discharges the hydrogen gas being evolved during the course of operation. The additional case 23' may advantageously be designed to have a small capacity for the amount of hydrogen to be released from the occlusive metal 21 so that the permeation capacity of the pipe 18" of palladium or its alloy may be accordingly small.

What is claimed is:

1. A hydrogen gas extractor adapted for use with a refrigerating machine in which a high vacuum is maintained and hydrogen gas is evolved largely by corrosive reactions of a solution, comprising a case, hydrogen gas exhaust means fabricated of palladium or its alloy and gastightly secured through the walls of said case, a connecting pipe communicated at one end with said machine and open at the other end in said case, a mass of metal contained in said case, said metal being capable of occluding hydrogen gas at ordinary temperature and releasing the same at elevated temperature, and heater means for heating both said hydrogen gas exhaust means and said metal.

2. The extractor of claim 1 which further comprises a container chamber in addition to the case, said chamber accommodating the metal and provided with means for heating said metal.

3. The extractor of claim 2 wherein a duct connecting the connecting pipe to the container chamber is provided with a valve midway which is closed during the operative period and is open while the machine lies idle.

4. A hydrogen gas extractor adapted for use with a refrigerating system in which a high vacuum is maintained and hydrogen gas is evolved largely by corrosive reaction of a refrigerating solution with component parts of the system, comprising casing means for receiving at least noncondensable hydrogen in said system, hydrogen gas permeable means of palladium or its alloy and gas tightly secured through the wall of said casing means and communicating with the atmosphere for purging hydrogen gas permeating through said permeating means into the atmosphere, connecting pipe means for connecting said casing means to said system, a mass of metal contained in said casing means sufficient to occlude, at ambient temperatures, the amount of hydrogen generated during prolonged inoperative periods of the system and to release the occluded hydrogen at predetermined elevated temperatures, and heater means to provide, during operation of the system, said elevated temperatures whereby to release, at a predetermined pressure, through said permeating means not only the hydrogen gases occluded during said inoperative period of the system but also the hydrogen gases generated during its operation.

5. A hydrogen gas extractor according to claim 4, wherein said predetermined pressure of release of said hydrogen gases is higher than atmospheric pressure whereby the hydrogen gases are automatically purged.

6. A hydrogen gas extractor according to claim 4, wherein said casing means comprises first and second casings, said connecting pipe means being branched to communicate the system with said first and second casings, said hydrogen gas permeable means being provided in one of said casings and said mass of metal in the other casing.

7. A hydrogen gas extractor according to claim 6, wherein said heater means comprises separate heaters one for said gas permeable means and the other for said mass of metal.

8. A hydrogen gas extractor according to claim 6, wherein said connecting means has a U-shaped branch which communicates with the second casing in a position of the latter adjacent the first casing, a solenoid valve being connected in that leg of the U-shaped branch which interconnects the vertical legs thereof, said heater means comprising a single heater disposed between said first and second casings.

* * * * *